United States Patent
Chung et al.

(10) Patent No.: US 10,256,683 B2
(45) Date of Patent: Apr. 9, 2019

(54) ELECTRIC MACHINE HAVING ASYMMETRIC MAGNETIC POLE SHAPE FOR TORQUE RIPPLE REDUCTION

(71) Applicant: KOREA ELECTROTECHNOLOGY RESEARCH INSTITUTE, Changwon (KR)

(72) Inventors: Shi Uk Chung, Changwon (KR); Byung Chul Woo, Changwon (KR); Ji Young Lee, Changwon (KR); Yon Do Chun, Changwon (KR); Do Kwan Hong, Busan (KR)

(73) Assignee: KOREA ELECTROTECHNOLOGY RESEARCH INSTITUTE, Changwon (KR)

( * ) Notice: Subject to any disclaimer, the term of this patent is extended or adjusted under 35 U.S.C. 154(b) by 601 days.

(21) Appl. No.: 14/466,894

(22) Filed: Aug. 22, 2014

(65) Prior Publication Data
US 2015/0054372 A1     Feb. 26, 2015

(30) Foreign Application Priority Data
Aug. 23, 2013   (KR) ........................ 10-2013-0100250

(51) Int. Cl.
*H02K 41/03*     (2006.01)
*H02K 1/24*      (2006.01)
*H02K 29/03*     (2006.01)
*H02K 1/27*      (2006.01)

(52) U.S. Cl.
CPC .............. *H02K 1/24* (2013.01); *H02K 1/276* (2013.01); *H02K 1/278* (2013.01); *H02K 1/2746* (2013.01); *H02K 29/03* (2013.01); *H02K 41/031* (2013.01)

(58) Field of Classification Search
CPC ........ H02K 29/03; H02K 1/24; H02K 1/2746; H02K 1/278; H02K 41/031
USPC ............ 310/154.21, 154.22, 154.24, 154.26, 310/154.27, 154.28, 154.29, 49.36, 310/156.68, 216.096, 156.08, 156.39
See application file for complete search history.

(56) References Cited

U.S. PATENT DOCUMENTS

| | | | | |
|---|---|---|---|---|
| 6,072,257 A * | 6/2000 | Akemakou | .......... | H02K 21/042 310/156.55 |
| 6,104,108 A * | 8/2000 | Hazelton | ............ | G03F 7/70758 310/12.06 |
| 6,628,030 B2 * | 9/2003 | Harada | .................. | H02K 23/04 310/154.28 |
| 8,039,998 B2 * | 10/2011 | Masuzawa | ............ | H01F 1/0578 310/156.43 |
| 8,397,369 B2 * | 3/2013 | Smith | .................. | H02K 1/2766 29/596 |
| 9,605,656 B2 * | 3/2017 | Wu | .......................... | F03D 1/00 |
| 2003/0102723 A1 * | 6/2003 | Korenaga | .......... | G03F 7/70758 310/12.24 |

(Continued)

FOREIGN PATENT DOCUMENTS

JP    2000-333429 A    11/2000
JP    2004-048912 A    2/2004

(Continued)

*Primary Examiner* — Bernard Rojas
*Assistant Examiner* — Maged M Almawri

(57) ABSTRACT

There is provided an electric machine, which is configured such that magnetic poles provided on a stator and a mover or rotor of the electric machine have an asymmetric shape, thus being capable of reducing a torque ripple.

26 Claims, 14 Drawing Sheets

(56) References Cited

U.S. PATENT DOCUMENTS

| | | | | |
|---|---|---|---|---|
| 2008/0197739 | A1* | 8/2008 | Nashiki | H02K 1/06 310/156.55 |
| 2009/0021089 | A1* | 1/2009 | Nashiki | H02K 21/24 310/46 |
| 2009/0189470 | A1* | 7/2009 | McClellan | H01F 7/0278 310/154.29 |
| 2010/0033051 | A1* | 2/2010 | Takabatake | H02K 1/02 310/156.32 |
| 2010/0133939 | A1* | 6/2010 | Takemoto | H02K 1/278 310/156.43 |
| 2010/0327670 | A1* | 12/2010 | Chung | H02K 41/031 310/12.15 |
| 2011/0012463 | A1* | 1/2011 | Duncan | H02K 1/2786 310/156.43 |
| 2012/0091940 | A1* | 4/2012 | Nashiki | H02K 19/103 318/701 |
| 2012/0133232 | A1* | 5/2012 | Kimiabeigi | H02K 1/17 310/156.49 |
| 2012/0139372 | A1* | 6/2012 | Nakano | H02K 1/148 310/83 |
| 2012/0139380 | A1* | 6/2012 | Taniguchi | H02K 1/2746 310/156.48 |
| 2012/0169171 | A1* | 7/2012 | Jansen | H02K 1/278 310/156.49 |
| 2012/0313473 | A1* | 12/2012 | Chen | H02K 1/27 310/156.07 |
| 2013/0106229 | A1* | 5/2013 | Goto | H02K 1/2746 310/156.54 |
| 2013/0169099 | A1* | 7/2013 | Saban | H02K 1/278 310/156.12 |
| 2013/0214631 | A1* | 8/2013 | Smith | H02K 1/2766 310/156.07 |
| 2013/0313936 | A1* | 11/2013 | Shibata | H02K 1/27 310/156.43 |
| 2014/0132102 | A1* | 5/2014 | Peng | H02K 1/2793 310/156.07 |
| 2015/0357870 | A1* | 12/2015 | Hazeyama | H02K 1/2766 310/156.07 |

FOREIGN PATENT DOCUMENTS

| | | |
|---|---|---|
| JP | 2012-029540 A | 2/2012 |
| KR | 10-2006-0008148 A | 1/2006 |
| KR | 10-2011-0001465 A | 1/2011 |
| KR | 10-2013-0077674 A | 7/2013 |

* cited by examiner

FIG. 1
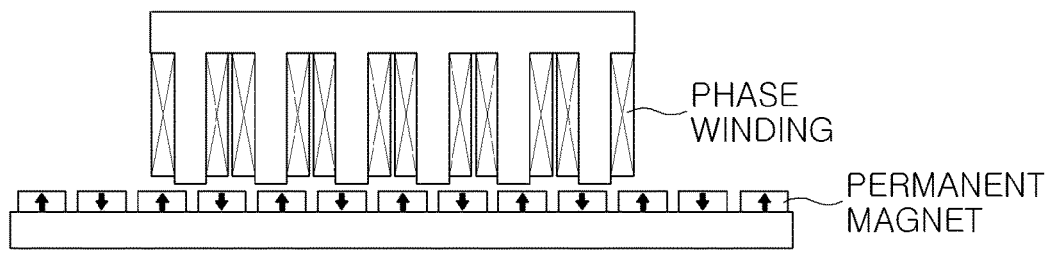
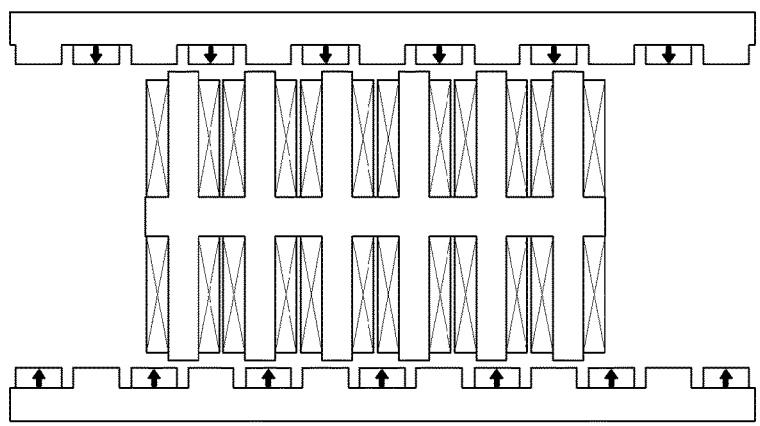
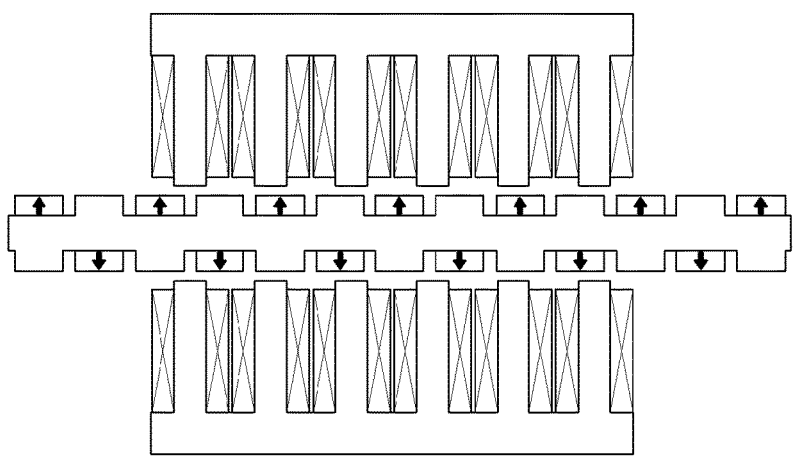
—PRIOR ART—

ELECTRIC MACHINE HAVING ASYMMETRIC MAGNETIC POLE SHAPE FOR TORQUE RIPPLE REDUCTION

BACKGROUND OF THE INVENTION

1. Field of the Invention

The present invention relates, in general, to an electric machine, such as a motor, and, more particularly, to an electric machine, which is configured such that magnetic poles provided on a stator and a mover or rotor of the electric machine have an asymmetric shape, thus being capable of reducing a torque ripple.

2. Description of the Related Art

As a patent document related to the present invention, Korean Patent Application Publication No. 10-2011-0001465 (published on Jan. 6, 2011) has been proposed.

A general electric machine, such as a conventional permanent magnet linear synchronous motor according to the cited document, is problematic in that many permanent magnets are used at the stator, the mover, the rotor or the like, as shown in FIG. 1, so that it is difficult to control a position due to a torque (thrust) ripple, and vibrations and noise are undesirably generated.

SUMMARY OF THE INVENTION

Accordingly, the present invention has been made keeping in mind the above problems occurring in the related art, and an object of the present invention is to provide an electric machine, in which magnetic poles having an asymmetric shape and an asymmetric arrangement and various configurations thereof are applied to a stator and a mover or rotor, thus being capable of reducing the torque ripple of the electric machine.

In order to accomplish the above object, the present invention provides an electric machine having a stator and a rotor or mover that is opposite to the stator and is moved relative to the stator, wherein a plurality of magnetic poles is periodically arranged at a predetermined interval on the stator, or a plurality of magnetic poles is periodically arranged at a predetermined interval on the rotor or mover, and the plurality of magnetic poles is manufactured in an asymmetric shape to realize an asymmetric magnetic-pole arrangement for the purpose of reducing a torque ripple. Further, the plurality of magnetic poles may include an asymmetric arrangement of the asymmetric magnetic poles. The plurality of magnetic poles may include a repeated structure of the asymmetric arrangement.

Each of the plurality of magnetic poles may include an asymmetric permanent magnet having an asymmetric shape.

At least one of edges of the asymmetric permanent magnet may have a chamfered shape, a fillet shape, a quarter elliptical shape, a certain convex shape, or a certain concave shape to realize the asymmetric shape.

The plurality of magnetic poles may include a periodic arrangement of the asymmetric permanent magnet having the asymmetric shape and an asymmetric core.

At least one of edges of the asymmetric core may have a chamfered shape, a fillet shape, a quarter elliptical shape, a certain convex shape, or a certain concave shape to realize the asymmetric shape.

The plurality of magnetic poles may include asymmetric cores of the asymmetric shape, which are periodically arranged, with at least one permanent magnet embedded in the asymmetric core.

The asymmetric permanent magnet may include asymmetric permanent magnets which are stacked in two layers.

The asymmetric permanent magnet may include a Halbach array of permanent magnets, which has the asymmetric permanent magnet at a center.

The asymmetric core may include a flux concentrator structure, in which permanent magnets are attached to left and right sides of a pole piece having the asymmetric shape on at least one of edges thereof. The asymmetric core may include an electromagnet structure, in which a coil is wound around the pole piece having the asymmetric shape, by applying the shoe shape to the end thereof.

The asymmetric core may include a flux concentrator structure, in which permanent magnets are attached to left and right sides of a pole piece having the asymmetric shape by applying a shoe shape to an end thereof. The asymmetric core may include an electromagnet structure, in which a coil is wound around the pole piece having the asymmetric shape, by applying the shoe shape to the end thereof.

A core of the rotor periodically may include asymmetric core portions each having the asymmetric shape, with the permanent magnet embedded in each of the asymmetric core portions. The core of the rotor having the embedded permanent magnet may include a structure stacked in two or more layers in a direction perpendicular to a rotating direction.

The asymmetric permanent magnet may be disposed on each of first and second cores that are spaced apart from each other.

The asymmetric permanent magnet may be attached to an associated core in such a way as to be embedded therein or to protrude therefrom.

Facing portions of permanent magnets disposed on the first core and of permanent magnets disposed on the second core may have the same shape or different shapes.

The asymmetric permanent magnet may be disposed on each of first and second sides of one core.

The asymmetric permanent magnet may be attached to the one core in such a way as to be embedded therein or to protrude therefrom.

Facing portions of permanent magnets disposed on the first side and of permanent magnets disposed on the second side, may have the same shape or different shapes.

The asymmetric permanent magnet may be disposed on only a side of one core.

The asymmetric permanent magnet may be attached to the one core in such a way as to protrude therefrom, or may be embedded in each of cores that are periodically formed at a predetermined interval on the one core.

The asymmetric permanent magnets may be arranged such that same edge shapes are oriented in a same direction or the same edge shapes are alternately placed.

As is apparent from the above description, the electric machine according to the present invention is advantageous in that the asymmetric shape and the asymmetric arrangement of the magnetic poles are applied to the stator and the mover or rotor, namely, the shape in which the asymmetric permanent magnet or the permanent magnet is embedded in the core, the shape of the consequent pole created by substituting the core for the N- or S-pole, the magnetic-flux concentrating structure, or the Halbach array is implemented and applied, thus effectively reducing a torque ripple.

BRIEF DESCRIPTION OF THE DRAWINGS

The above and other objects, features and advantages of the present invention will be more clearly understood from the following detailed description taken in conjunction with the accompanying drawings, in which:

FIG. 1 is a view illustrating the structure of a conventional permanent magnet linear synchronous motor;

DESCRIPTION OF PREFERRED EMBODIMENTS

The above and other objects and features of the invention will be described more fully hereinafter with reference to the accompanying drawings, in which example embodiments of the inventions are shown.

The electric machine mentioned in the present invention means various application devices including a motor that requires a rotary motion or a linear motion, such as a direct driving field, a power generator, a compressor, a finishing machine, an electric car, or an industrial electric machine. In these various devices, the electric machine of the present invention may include a stator and a mover that is opposite to the stator and performs a linear or curvilinear motion. Alternatively, the electric machine may include a stator and a rotor that is opposite to the stator and performs a rotary motion. In this context, a relative motion between the stator and the mover or between the stator and the rotor may be performed by an electromagnetic force generated between a phase winding, wound around any one of the above-mentioned components, and permanent magnets disposed on the opposite component. Many permanent magnets are used for the stator, the mover, the rotor or the like. However, it is difficult to control a position; additionally, vibration and noise are undesirably generated, due to a torque (thrust) ripple resulting from electromagnetic interaction between the permanent magnet and a toothed slot. In order to resolve these aforementioned problems, the present invention proposes a structure, in which an asymmetric magnetic pole, the asymmetric arrangement of magnetic poles, or a combination thereof are applied to the stator, the mover, or the rotor; thus being capable of effectively reducing the torque ripple.

Figure 2:
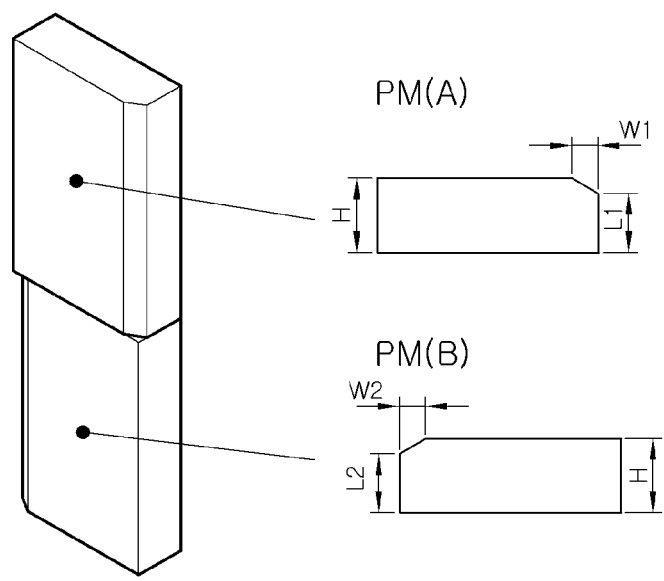
FIG. 2 is a view illustrating an asymmetric magnetic pole structure for reducing a torque ripple according to an embodiment of the present invention.

FIG. 2 is a view illustrating an asymmetric magnetic pole (e.g., permanent magnet) structure for reducing a torque ripple according to an embodiment of the present invention.

Figure 3:
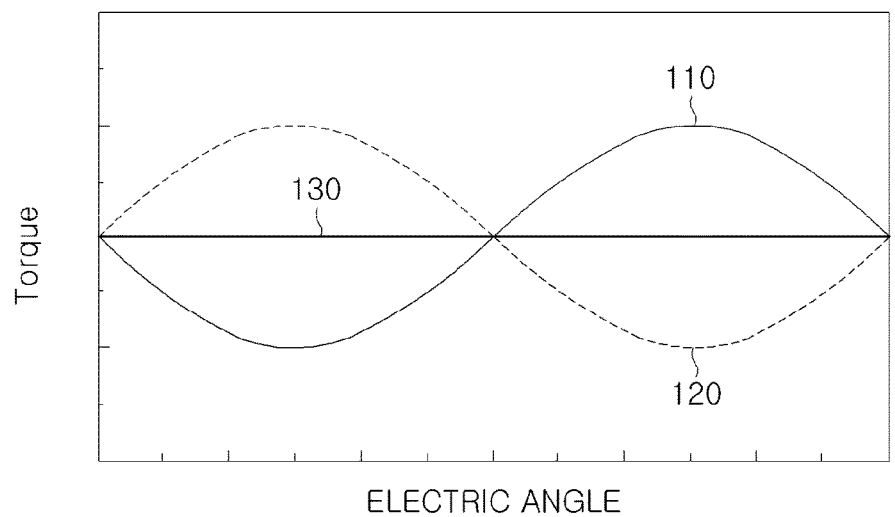
FIG. 3 is a torque graph for explaining torque ripple reduction in a double-layered magnetic pole of FIG. 2.

As shown in FIG. 2, asymmetric magnetic poles PM(A) and PM(B) which have an asymmetric shape on a horizontal section are asymmetrically stacked or arranged in two or more layers, and then are applied to the stator, the mover, the rotor or the like. Thereby, as shown in FIG. 3, it is possible to design the structure such that the torque 110 by the magnetic pole PM(A) is almost equal in magnitude to the torque 120 by the magnetic pole PM(B) and a phase difference between the magnetic poles PM(A) and PM(B) is 180 degrees. As a result, torque 130 can be effectively reduced.

Referring to the drawing, any one edge of each of the asymmetric magnetic poles PM(A) and PM(B) is chamfered. However, the invention may be configured as follows without being limited thereto: one or more edges are manufactured to take a chamfered shape, a fillet shape, a quarter elliptical shape, or any convex or concave shape (see FIG. 11), so that each of the asymmetric magnetic poles PM(A) and PM(B)) may have an asymmetric shape, or edges (e.g. chamfered portions) having the same shape may be asymmetrically arranged to be oriented in the opposing directions (the same direction is possible in some cases). This does not mean that the edge portion of the magnetic pole PM(A) processed via chamfering so as to provide the asymmetric structure has the same shape as the edge portion of the magnetic pole PM(B) processed via chamfering so as to provide the asymmetric structure. For example, the magnetic poles PM(A) and the PM(B) may be different in chamfering angle from each other, so that the chamfered portions of the magnetic poles PM(A) and the PM(B) may be different in horizontal and vertical lengths from each other, and thereby the widths W1 and W2 of the chamfered portions may be different from each other. In addition, the stacked asymmetric magnetic poles PM(A) and PM(B) may be different from each other in width and height (longer sides H1 and H2/shorter sides L1 and L2). These asymmetric magnetic poles PM(A) and PM(B) may be designed to have proper width, length, thickness, horizontal and vertical lengths of the chamfered portions for the purpose of reducing the torque ripple.

Further, the reduction of the torque ripple using the asymmetry of the magnetic poles according to the present invention may be realized by the asymmetric permanent magnet, namely, the asymmetric arrangement (two magnetic poles may adopt a vertical asymmetric arrangement, a horizontal asymmetric arrangement, or a repeated structure of the above-described asymmetric arrangement) of the asymmetric magnetic poles. Moreover, the following structure or arrangement is possible: a configuration wherein the permanent magnet is embedded in the core, a consequent pole configuration wherein a core is substituted for an N- or S-pole, a magnetic-flux concentrating structure, a Halbach array, a linear or annular arrangement of the asymmetric magnetic pole such as an electromagnetic structure, or a structure wherein magnetic poles are arranged on both sides of one core or are arranged, respectively, on two cores.

As will be described below, this concept may be expanded to a reduction in torque ripple between the asymmetric magnetic poles disposed on the respective cores when two or more cores are present (see FIGS. 4 and 5), a reduction in torque ripple between the asymmetric magnetic poles disposed on both sides of the single core (see FIGS. 6 and 7), a reduction in torque ripple between the asymmetric magnetic poles disposed on only a side of the single core (see FIGS. 8 and 9), or a reduction in torque ripple between the asymmetric magnetic pole disposed on a side of the single core and the asymmetric core (see FIG. 10). Various asymmetric magnetic pole structures, such as the magnetic-flux concentrating structure or the Halbach array as shown in FIGS. 11 to 14, are applied, thus effectively reducing the ripple by the torque generated in the stator, the mover, or the rotor.

First, the electric machine according to the embodiment of the present invention shown in FIGS. 4 to 10 has a stator, and a rotor or mover that is opposite to the stator and is moved relative to the stator. Further, a plurality of asymmetric magnetic poles is manufactured in the asymmetric shape as shown in FIG. 2 for the purpose of reducing the torque ripple, and then is periodically arranged at a predetermined interval (e.g., pole pitch). These magnetic poles may be disposed on the core (subject core) of the associated stator, rotor, or mover.

Hereinafter, the arrangement of the asymmetric permanent magnet or core on the subject core for the stator, rotor, or mover of the associated electric machine will be described. By way of example, the subject core may be linear and the mover may perform a linear motion. However, this invention is not limited thereto. That is, the subject core may have a curved shape and thus the mover may perform a curvilinear motion. Alternatively, the subject core may have a circular shape and thus the rotor may perform a circular motion.

Figure 4:
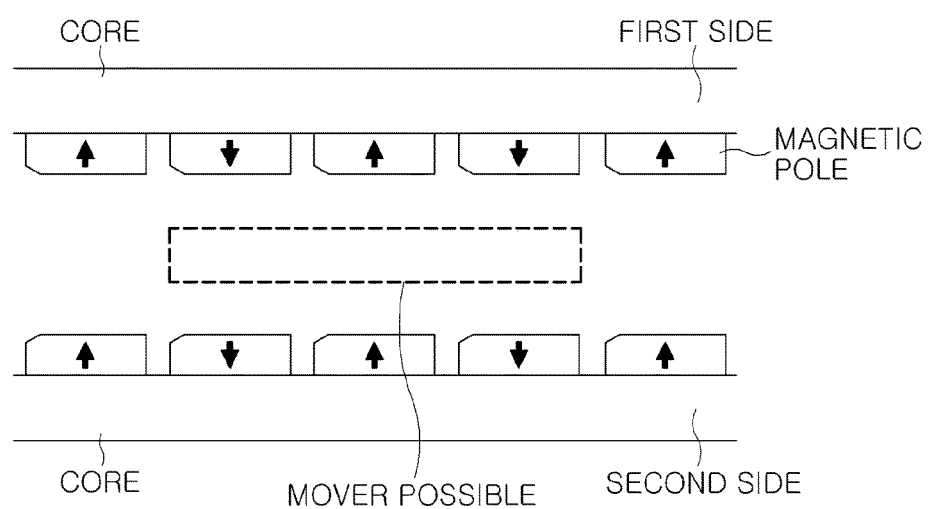
FIG. 4 is a view showing an example of an electric machine according to an embodiment of the present invention.

FIG. 4 is a view showing an example of an electric machine according to an embodiment of the present invention. In the example of FIG. 4, the subject core for the stator, the rotor, or the mover of the associated electric machine includes two facing cores, that is, a first core and a second core. In this regard, two cores may be the stator, so that the mover or rotor placed therebetween may perform a relative movement. Alternatively, two cores may be the mover or rotor which is opposite to the stator positioned therebetween, so that the mover or rotor may perform a relative movement. In this example, the magnetic poles are arranged such that their polarities (see, arrows) are alternately changed. However, the polarities of the magnetic poles may be arranged in various ways according to the design purpose.

This example includes the plurality of magnetic poles: the asymmetric magnetic poles are periodically arranged at a predetermined interval on each of the first and second cores. Particularly, the magnetic poles are oriented such that facing portions of the magnetic poles arranged on the first and second cores have the same shape. That is, the chamfered portion of the magnetic pole of the first core located at an upper position faces the chamfered portion of the magnetic pole of the second core located at a lower position.

Figure 5:
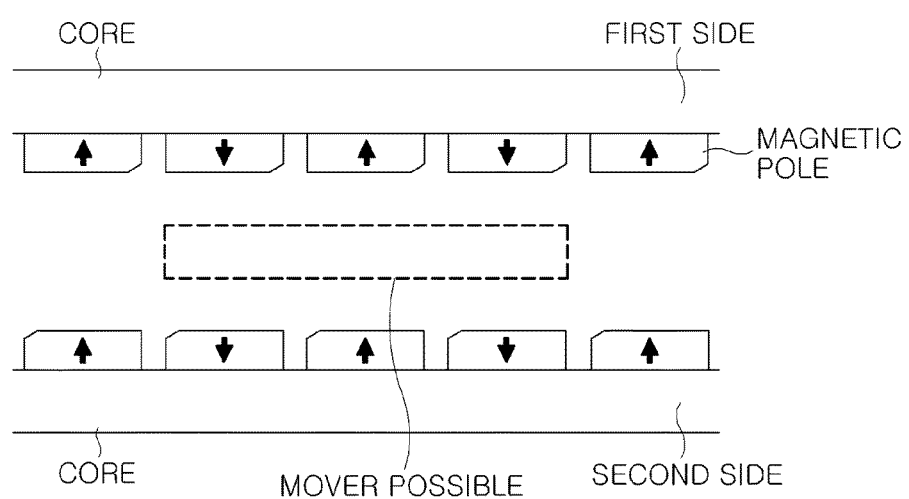
FIG. 5 is a view showing an example of an electric machine according to another embodiment of the present invention.

FIG. 5 illustrates another embodiment that is similar to that of FIG. 4. However, according to this embodiment, the facing portions of the magnetic poles arranged on the first core which is at the upper position and of the magnetic poles arranged on the second core which is at the lower position have different shapes. In other words, a chamfered portion of the magnetic pole of the first core located at the upper position faces a non-chamfered portion of the magnetic pole of the second core located at the lower position, while a non-chamfered portion of the magnetic pole of the first core located at the upper position faces a chamfered portion of the magnetic pole of the second core located at the lower position.

In the structures of FIGS. 4 and 5, the torque ripple between the facing magnetic poles of the first and second cores may be reduced according to the principle of FIG. 3. Each of the magnetic poles arranged on the first and second cores may be implemented in a structure where two or more asymmetric magnetic poles are stacked as shown in FIG. 2 (e.g., instead of one magnetic pole as shown in the drawing, two asymmetric magnetic poles may be stacked such that asymmetric portions formed by chamfering or the like are oriented in opposite directions).

Figure 6:
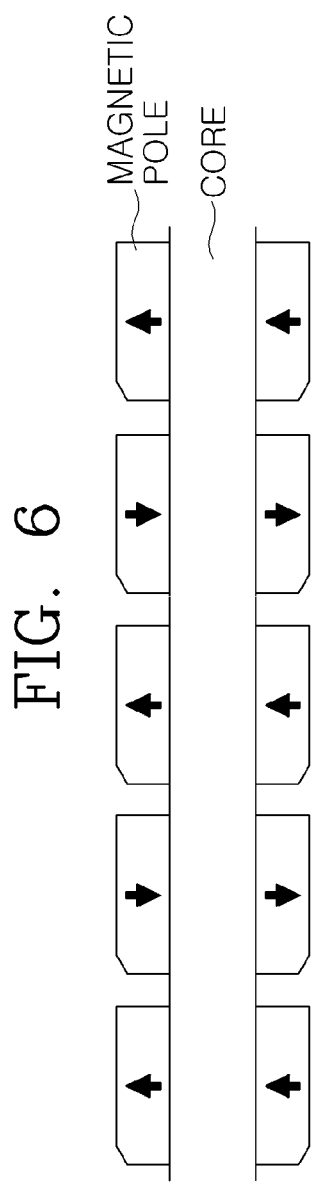
FIG. 6 is a view showing an example of an electric machine according to a further embodiment of the present invention.

FIG. 6 is a view showing an example of an electric machine according to a further embodiment of the present invention. In the example of FIG. 6, the subject core for the stator, the rotor, or the mover of the associated electric machine includes one core. In this regard, one subject core may be the stator, so that the mover or rotor located at the upper or lower position may perform a relative movement. Alternatively, one subject core may be the mover or rotor which is opposite to the stator located at the upper or lower position, so that the mover or rotor may perform a relative movement. In this example, the magnetic poles are arranged such that their polarities (see, arrows) are alternately changed. However, the polarities of the magnetic poles may be arranged in various ways according to the design purpose.

Here, the magnetic poles are arranged such that facing portions of the magnetic poles disposed on either the upper or lower side, namely, a first side and of the magnetic poles disposed on the remaining side, namely, a second side, have the same shape. In other words, the chamfered portion of the magnetic pole of the first side, which is at the upper position, faces the chamfered portion of the magnetic pole of the second side, which is at the lower position.

Figure 7:
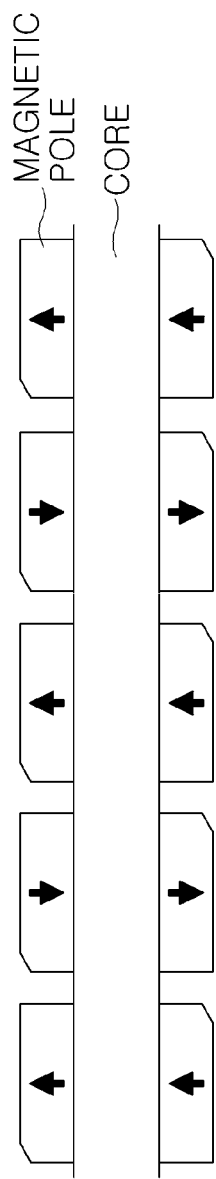
FIG. 7 is a view showing an example of an electric machine according to yet another embodiment of the present invention.

FIG. 7 illustrates a further embodiment that is similar to that of FIG. 6. However, according to this embodiment, the facing portions of the magnetic pole arranged on the first side which is at the upper position and of the magnetic pole arranged on the second side which is at the lower position have different shapes. In other words, a chamfered portion of the magnetic pole of the first side located at the upper position faces a non-chamfered portion of the magnetic pole of the second side located at the lower position, while a non-chamfered portion of the magnetic pole of the first side located at the upper position faces a chamfered portion of the magnetic pole of the second side located at the lower position.

In the structures of FIGS. 6 and 7, the torque ripple between the facing magnetic poles of the first and second sides may be reduced according to the principle of FIG. 3. Each of the magnetic poles arranged on the first and second sides may be implemented in a structure where two or more asymmetric magnetic poles are stacked as shown in FIG. 2 (e.g., instead of one magnetic pole of the drawing, two asymmetric magnetic poles may be stacked such that asymmetric portions formed by chamfering or the like are oriented in opposite directions).

Figure 8:
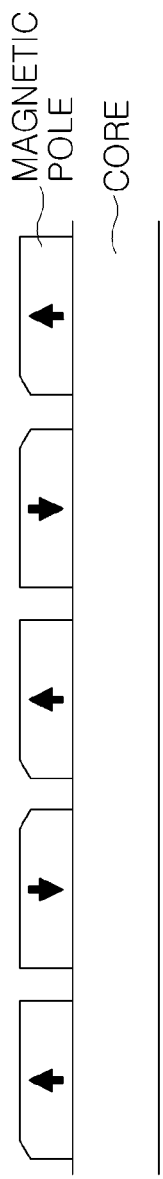
FIG. 8 is a view showing an example of an electric machine according to a still further embodiment of the present invention.

FIG. 8 is a view showing an example of an electric machine according to a still further embodiment of the present invention. In the example of FIG. 8, the subject core for the stator, the rotor, or the mover of the associated electric machine includes one core. In this regard, one subject core may be the stator, so that the mover or rotor located at the upper position may perform a relative movement. Alternatively, one subject core may be the mover or rotor which is opposite to the stator located at the upper position, so that the mover or rotor may perform a relative movement. In this example, the magnetic poles are arranged such that their polarities (see, arrows) are alternately changed. However, the polarities of the magnetic poles may be arranged in various ways according to the design purpose.

Here, the magnetic poles are arranged such that portions having a certain edge shape (portions chamfered for the asymmetry) are alternately present.

Figure 9:
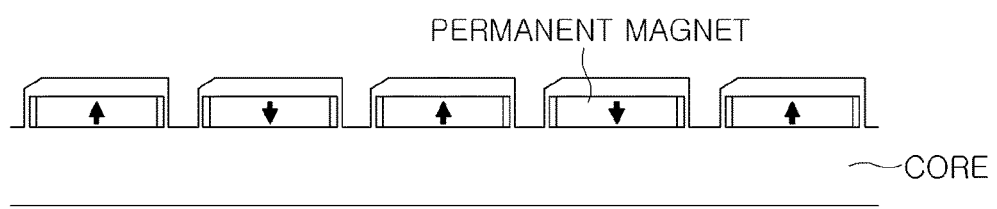
FIG. 9 is a view showing an example of an electric machine according to an additional embodiment of the present invention.

In the structures of FIGS. 8 and 9, the torque ripple between neighboring magnetic poles may be reduced according to the principle of FIG. 3. Each of the magnetic poles may be implemented in a structure where two or more asymmetric magnetic poles are stacked as shown in FIG. 2 (e.g., instead of one magnetic pole of the drawing, two asymmetric magnetic poles may be stacked such that asymmetric portions formed by chamfering or the like are oriented in opposite directions).

Figure 10:
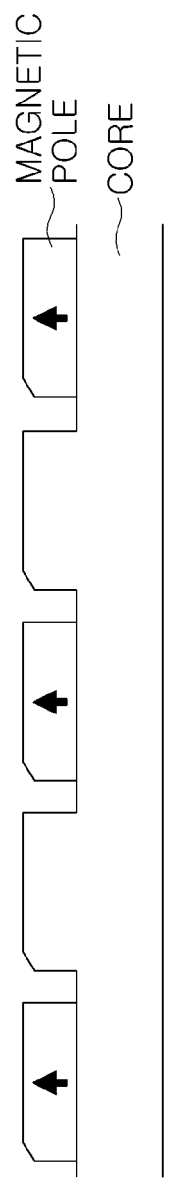
FIG. 10 is a view showing an example of an electric machine according to another embodiment of the present invention.

FIG. 10 is a view showing an example of an electric machine according to another embodiment of the present invention. In the example of FIG. 10, the subject core for the stator, the rotor, or the mover of the associated electric machine includes one core. In this regard, one subject core may be the stator, so that the mover or rotor located at the upper position may perform a relative movement. Alternatively, one subject core may be the mover or rotor which is opposite to the stator located at the upper position, so that the mover or rotor may perform a relative movement. In this example, the magnetic poles are arranged to have the same polarity (see, arrows). However, the polarities of the magnetic poles may be arranged in various ways according to the design purpose, for example, may be arranged to be alternately changed.

This example includes a plurality of permanent magnets, in which pairs of magnetic poles (see FIG. 2) and asymmetric protruding magnetic poles are periodically arranged at a predetermined interval (e.g. twice as large as the pole pitch) on a side of one subject core. The same shaped edge portions (portions chamfered for the asymmetry) of the magnetic pole and the protruding core may be arranged to be oriented in the same direction or may be alternately arranged. The asymmetric protruding core may be integrated into the core, or may be manufactured separately from the core and then attached to a desired portion thereof. In this example, a consequent pole shape is shown, in which the symmetric magnetic pole (see FIG. 2) makes a pair with the asymmetric protruding core. However, this invention is not limited thereto, and one asymmetric protruding core that becomes the asymmetric magnetic pole may be arranged after a plurality of permanent magnets is arranged.

Further, any one of the edges of the asymmetric protruding core may be manufactured to have a chamfering shape, a fillet shape, a quarter elliptical shape, a certain convex or concave shape (see FIG. 11), etc., thus allowing each protruding core to have the asymmetric shape.

Figure 11:
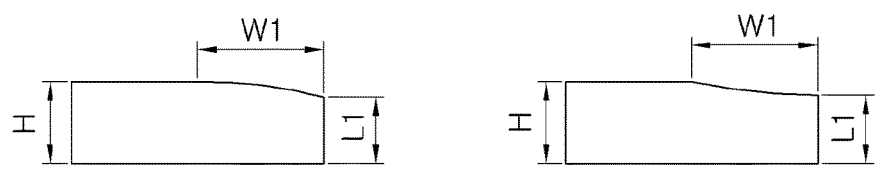
FIG. 11 is a view showing other examples of the magnetic pole structure according to the present invention.

As shown in FIG. 11, when any one of the edges is made to have the certain convex or concave shape for the purpose of providing the asymmetric magnetic pole, for example, horizontal and vertical lengths of the associated convex or concave portion may be different, so that the width W1 may vary. In addition, the asymmetric magnetic pole may be manufactured in various widths and heights (longer side H and lower side L1). That is, in order to reduce the torque ripple, the asymmetric magnetic pole may be properly designed in width, length, thickness, and horizontal and vertical lengths of the asymmetric portion according to the purpose.

Figure 12:
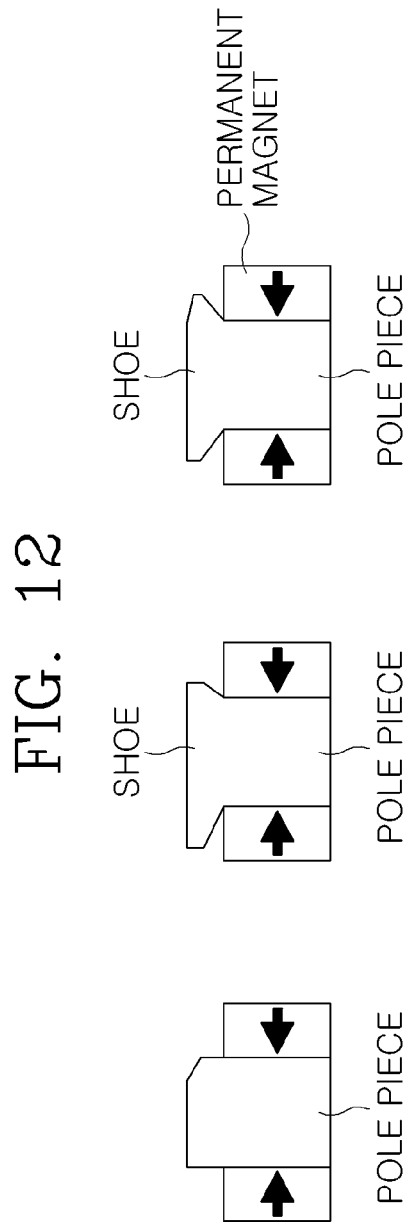
FIG. 12 is a view showing other examples of the magnetic pole structure according to the present invention.

Further, as shown in FIG. 12, the asymmetric magnetic pole may be similarly applied to various flux concentrator structures. For example, as shown in the left-handed drawing of FIG. 12, any one of the edges of the asymmetric magnetic pole may adopt a flux concentrator structure which is configured such that permanent magnets are attached to left and right sides of the asymmetric pole piece. Further, as shown in the middle drawing and right-handed drawing of FIG. 12, the asymmetric magnetic pole may adopt a flux concentrator structure which is configured such that permanent magnets are attached to left and right sides of the asymmetric pole piece having a shoe-shaped end. The asymmetric pole piece having the shoe-shaped end is configured as follows: the end extends from the pole piece in the shoe shape in such a way that one side thereof is wider or larger than the other side. Thus, it is possible to realize the asymmetric shape without the necessity of chamfering left and right sides of the end. As shown in the right-handed drawing of FIG. 12, the asymmetric pole piece having the shoe-shaped end is configured as follows: at least one of the left and right sides of the end may have the asymmetric shape through chamfering or the like as shown in FIGS. 2 and 11. The pole piece corresponding to the magnetic pole may be integrated with the associated core, or may be manufactured separately from the associated core and be disposed thereon after the permanent magnet is attached. In this example, the permanent magnets are arranged such that their polarities face each other. However, the polarity direction may be changed according to the purpose.

Figure 13:
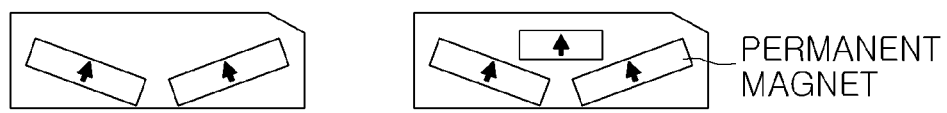
FIG. 13 is a view showing other examples of the magnetic pole structure according to the present invention.

As shown in FIG. 13, the asymmetric magnetic pole may be configured such that one or more permanent magnets are embedded therein. As shown in the left-handed drawing of FIG. 13, the sum of magnetic-flux vectors of two permanent magnets whose magnetic-flux direction is at an angle to the perpendicular direction of an end surface may serve as one magnetic pole. Further, as shown in the right-handed drawing of FIG. 13, the sum of magnetic-flux vectors of a permanent magnet whose magnetic-flux direction is perpendicular to the end surface and of a plurality of permanent magnets whose magnetic-flux direction is at an angle to the perpendicular direction of the end surface may serve as one magnetic pole. Of course, only one permanent magnet may be embedded in the asymmetric protruding core.

Figure 14:
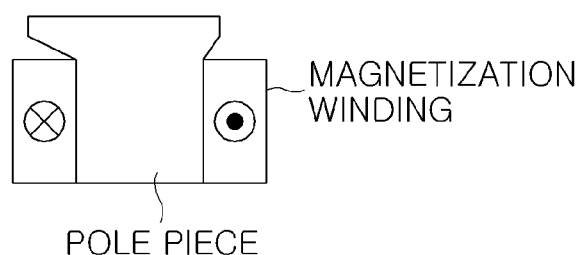
FIG. 14 is a view showing other examples of the magnetic pole structure according to the present invention.

As shown in FIG. 14, the asymmetric protruding core may be similarly applied to a structure where magnetization winding instead of the permanent magnet is applied to the pole piece. For example, as shown in FIG. 14, a coil is wound around the asymmetric pole piece having the shoe-shaped end, so that it becomes an electromagnet when power is applied thereto.

Figure 15:
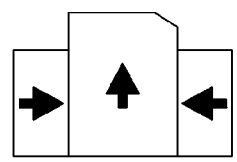
FIG. 15 is a view showing other examples of the magnetic pole structure according to the present invention.

Moreover, the permanent magnets for the respective magnetic poles that are periodically arranged may be implemented in the Halbach array, as shown in FIG. 15. That is, in order to implement the asymmetric magnetic pole, the above-described asymmetric permanent magnet is arranged at a center and permanent magnets are arranged on the opposite sides of the asymmetric permanent magnet, thus realizing the Halbach array. The polarities of the permanent magnets forming the respective magnetic poles, such as the left and right permanent magnets, may be oriented in various directions according to the purpose.

Figure 16:
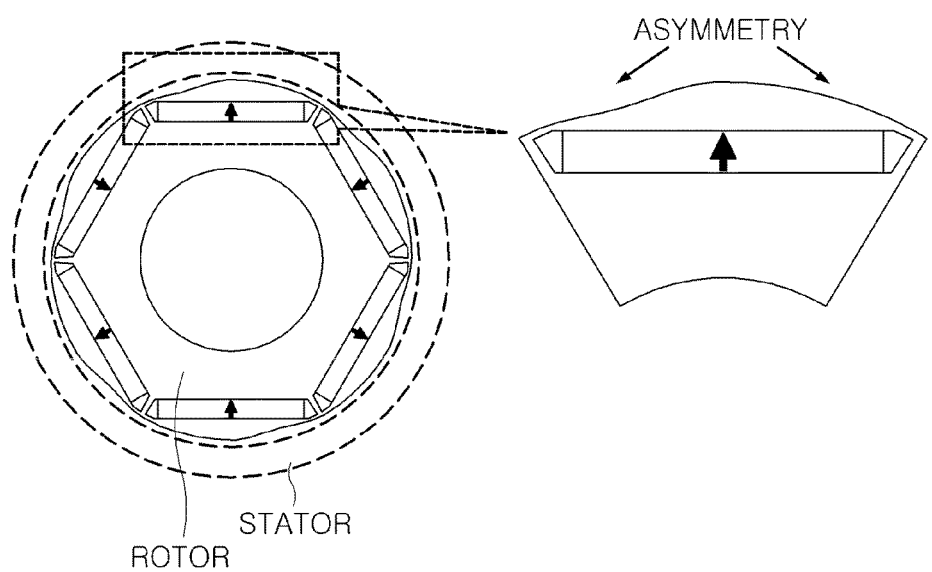
FIG. 16 is a view showing a magnetic pole according to an embodiment of the present invention, in which a rotor is configured such that a permanent magnet is embedded in an asymmetric core.

FIG. 16 is a view showing a magnetic pole according to an embodiment of the present invention, in which a rotor is configured such that a permanent magnet is embedded in an asymmetric core.

As shown in FIG. 16, the rotor is rotatably provided in the stator in such a way as to be opposite thereto. The rotor periodically has portions in which respective magnets are embedded. The core of each periodic portion is formed in the shape of the asymmetric core according to the above-described principle, and one or more permanent magnets are embedded in each periodic portion. Instead of such a structure, the asymmetric protruding core and the permanent-magnet embedded portion may be repeatedly arranged. Further, the core of the rotor configured as such may be stacked in two or more layers in a direction perpendicular to the rotating direction. The magnetic poles of neighboring layers may be asymmetrically arranged (e.g. asymmetric portions may be alternately arranged).

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An electric machine having a stator and a rotor or mover that is opposite to the stator and is moved relative to the stator,
    wherein a plurality of magnetic poles is periodically arranged at a predetermined interval on the stator, or a plurality of magnetic poles is periodically arranged at a predetermined interval on the rotor or mover,
    wherein the plurality of magnetic poles is manufactured in an asymmetric shape to realize an asymmetric magnetic-pole arrangement for the purpose of reducing a torque ripple,
    wherein the plurality of magnetic poles comprises a periodic arrangement of an asymmetric permanent magnet having a first asymmetric shape and an asymmetric core having a second asymmetric shape,
    wherein the outer circumferential surface of the second asymmetric shape is identical to the outer circumferential surface of the first asymmetric shape,
    wherein the asymmetry of each asymmetric permanent magnet is defined by a first edge of each asymmetric permanent magnet having a different shape from every other edge of the asymmetric permanent magnet,
    wherein the asymmetric permanent magnet has a layer structure comprising asymmetric permanent magnets stacked in two or more layers and arranged in a direction perpendicular to a surface of a core,
    wherein the asymmetric permanent magnets are asymmetrically arranged such that first edges of the asymmetric permanent magnets are oriented in opposing directions by layer and are oriented in same directions in a same layer, and
    wherein the asymmetric permanent magnets are asymmetrically arranged such that a first torque ripple of a first asymmetric permanent magnet located in a first layer of the layer structure and a second torque ripple of a second asymmetric permanent magnets located in a second layer of the layer structure have a same or similar magnitude and a phase difference of 180 degrees.

2. The electric machine as set forth in claim 1, wherein the first edge of each asymmetric permanent magnet has a chamfered shape, a fillet shape, a quarter elliptical shape, a certain convex shape, or a certain concave shape to realize the asymmetric shape.

3. The electric machine as set forth in claim 1, wherein the first edge of the asymmetric core has a chamfered shape, a fillet shape, a quarter elliptical shape, a certain convex shape, or a certain concave shape.

4. The electric machine as set forth in claim 1, wherein the asymmetric permanent magnet comprises a Halbach array of permanent magnets, which has the asymmetric permanent magnet at a center.

5. The electric machine as set forth in claim 1, wherein the asymmetric core comprises a flux concentrator structure, in which permanent magnets are attached to left and right sides of a pole piece having the asymmetric shape on at least one of edges thereof.

6. The electric machine as set forth in claim 1, wherein the first edge of the asymmetric permanent magnet has a chamfered shape, a fillet shape, a quarter elliptical shape, a certain convex shape, or a certain concave shape.

7. The electric machine as set forth in claim 1, wherein the plurality of magnetic poles comprises an asymmetric arrangement of the asymmetric magnetic poles.

8. The electric machine as set forth in claim 7, wherein the plurality of magnetic poles comprises a repeated structure of the asymmetric arrangement.

9. The electric machine as set forth in claim 1, wherein a core of the rotor periodically comprises asymmetric core portions each having the asymmetric shape, with the permanent magnet embedded in each of the asymmetric core portions.

10. The electric machine as set forth in claim 9, wherein the core of the rotor having the embedded permanent magnet comprises a structure stacked in two or more layers in a direction perpendicular to a rotating direction.

11. The electric machine as set forth in claim 1, wherein the asymmetric core comprises a flux concentrator structure, in which permanent magnets are attached to left and right sides of a pole piece having an asymmetric shape by applying a shoe shape to an end thereof.

12. The electric machine as set forth in claim 5, wherein the asymmetric core comprises an electromagnet structure, in which a coil is wound around the pole piece having an asymmetric shape, by applying the shoe shape to the end thereof.

13. The electric machine as set forth in claim 11, wherein the asymmetric core comprises an electromagnet structure, in which a coil is wound around the pole piece having the asymmetric shape, by applying the shoe shape to the end thereof.

14. The electric machine as set forth in claim 1, wherein the asymmetric permanent magnet is disposed on each of first and second cores that are spaced apart from each other.

15. The electric machine as set forth in claim 14, wherein the asymmetric permanent magnet is attached to an associated core in such a way as to be embedded therein or to protrude therefrom.

16. The electric machine as set forth in claim 14, wherein facing portions of permanent magnets disposed on the first core and of permanent magnets disposed on the second core have the same shape or different shapes.

17. The electric machine as set forth in claim 1, wherein the asymmetric permanent magnet is disposed on each of first and second sides of one core.

18. The electric machine as set forth in claim 17, wherein the asymmetric permanent magnet is attached to the one core in such a way as to be embedded therein or to protrude therefrom.

19. The electric machine as set forth in claim 17, wherein facing portions of permanent magnets disposed on the first side and of permanent magnets disposed on the second side, have the same shape or different shapes.

20. The electric machine as set forth in claim 1, wherein the asymmetric permanent magnet is disposed on only a side of one core.

21. The electric machine as set forth in claim 20, wherein the asymmetric permanent magnet is attached to the one core in such a way as to protrude therefrom, or is embedded in each of cores that are periodically formed at a predetermined interval on the one core.

22. The electric machine as set forth in claim 20, wherein the asymmetric permanent magnets are arranged such that same edge shapes are oriented in a same direction, or the same edge shapes are alternately placed.

23. The electric machine as set forth in claim 1, wherein the plurality of magnetic poles comprises asymmetric cores of the asymmetric shape, which are periodically arranged, with at least one permanent magnet embedded in the asymmetric core.

24. The electric machine as set forth in claim 23, wherein the asymmetric core comprises a flux concentrator structure, in which permanent magnets are attached to left and right sides of a pole piece having the asymmetric shape on at least one of edges thereof.

25. The electric machine as set forth in claim 23, wherein the asymmetric core comprises a flux concentrator structure, in which permanent magnets are attached to left and right sides of a pole piece having the asymmetric shape by applying a shoe shape to an end thereof.

26. The electric machine as set forth in claim 23, wherein a core of the rotor periodically comprises asymmetric core portions each having the asymmetric shape, with the permanent magnet embedded in each of the asymmetric core portions.

* * * * *